Patented Mar. 11, 1930

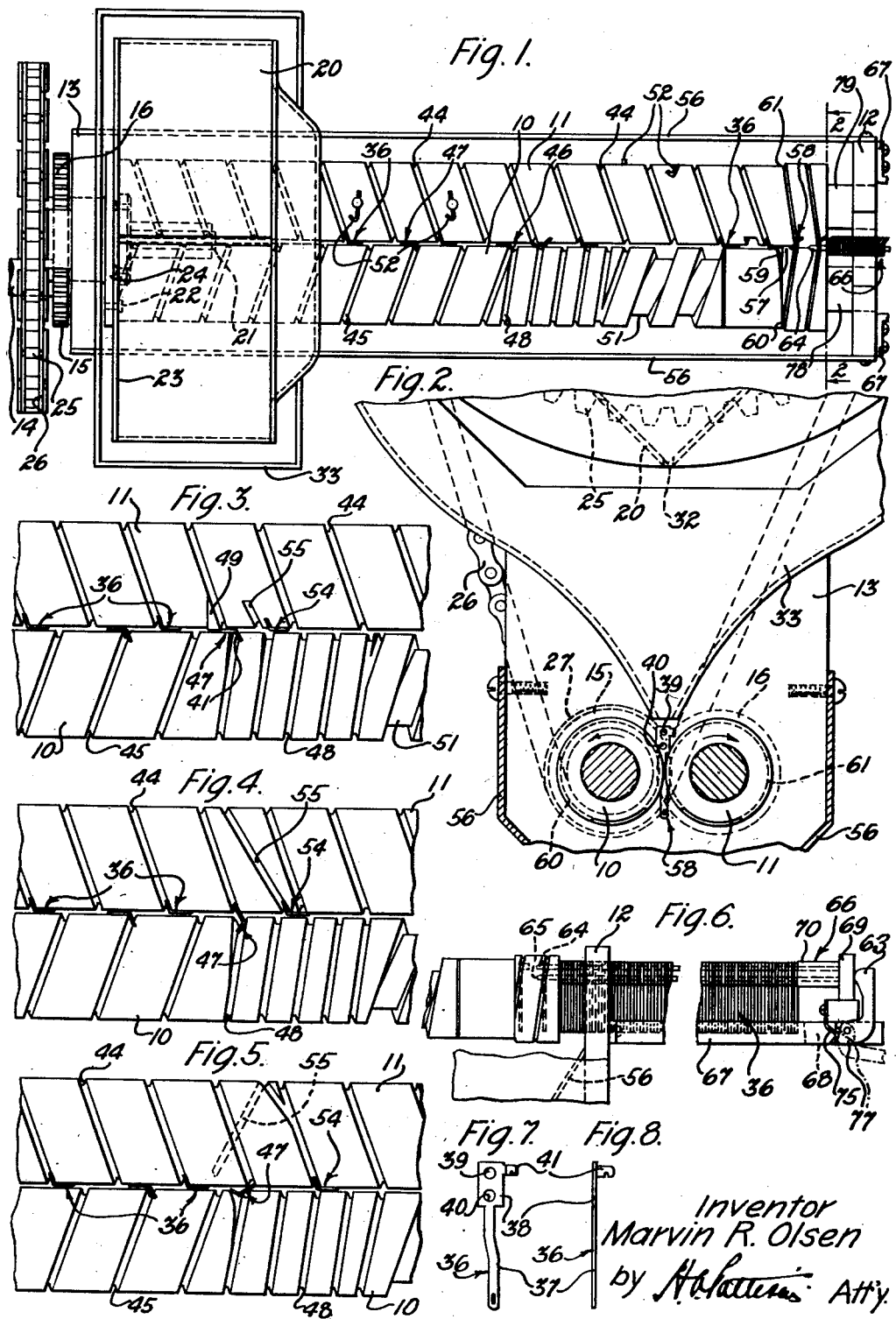

1,750,327

UNITED STATES PATENT OFFICE

MARVIN ROY OLSEN, OF CHICAGO, ILLINOIS, ASSIGNOR TO WESTERN ELECTRIC COMPANY, INCORPORATED, OF NEW YORK, N. Y., A CORPORATION OF NEW YORK

APPARATUS FOR ARRANGING ARTICLES

Application filed June 20, 1928. Serial No. 287,032.

This invention relates to apparatus for arranging articles, and more especially to such apparatus for arranging and magazining articles in predetermined positions to expedite assemblage with other parts.

Heretofore, it has been the practice in some instances for an operator to manually select articles from an indiscriminately arranged supply thereof and subsequently orient or properly arrange the articles into a definite order or group for assembly purposes. An example of such practice may be found in the manufacture of electro-magnetic relays extensively used in telephonic communicating systems, wherein relay terminals of considerable length having offset tangs on one side are selected from an indiscriminately arranged supply thereof and assembled in a predetermined position for assembly with other relay parts. Considerable effort and time are thus expended by the operators in selecting and properly orienting the articles to assemble the relays which are produced in large numbers.

The primary object of the invention is to provide a simple and inexpensive apparatus for arranging articles in a predetermined position and when necessary by turning certain of the articles around as they are advanced to a predetermined point.

A preferred embodiment of the invention consists of a device for arranging and magazining articles or parts wherein the articles are indiscriminately deposited upon a pair of oppositely rotating screw members having spiral ways or threads which are designed to receive the articles and effect their advancement. The thread on one of the members is provided for a certain portion of its length with a different pitch from that on the other member and has a rounded edge whereby parts which are conveyed by the members to that portion in one position are turned through an angle of 180° before they are magazined.

It is believed that a complete understanding of the invention may be had by reference to the following description, taken in conjunction with the accompanying drawings which illustrate an apparatus embodying the invention, in which Fig. 1 is a plan view of the apparatus;

Fig. 2 is an enlarged fragmentary sectional view taken on line 2—2 of Fig. 1;

Figs. 3, 4 and 5 are enlarged fragmentary plan views of portions of the screw members showing progressive rotational steps assumed by the members in the turning of a relay terminal part around;

Fig. 6 is a fragmentary elevational view of the delivery end of the screw members with a magazine attached for receiving and stacking the terminal parts, and Figs. 7 and 8 are detailed views of the terminal part to be oriented and magazined.

Referring now to the drawings wherein like numerals designate similar parts throughout the several views, the numerals 10 and 11 designate a pair of parallel and horizontally positioned screw members rotatably journaled within end frames 12 and 13. A reduced extremity 14 of the screw member 10 extends through and beyond the frame 13 and is connected with any suitable driving means (not shown). The screw member 11 is in turn driven in an opposite direction from the screw member 10 with their inner faces turning upwardly by means of spur gears 15 and 16 secured to the screw members 10 and 11, respectively.

A rotary hopper 20 adapted to hold a supply of articles to be properly arranged and magazined is removably secured to a spindle 21 (Fig. 1) by means of a latch pin 22 engaging an aperture in a vertical wall 23 of the hopper and secured to a disk 24 formed integral with the spindle. The spindle is suitably journaled in the upper portion of the frame 13 and has secured thereto a sprocket wheel 25 by means of which it is driven from the screw member 10 by a sprocket chain 26 and a sprocket 27 (Fig. 2) fastened to the screw member 10. The hopper 20 is rectangular in shape and is provided at each corner with a narrow slot 32 through which articles contained therein are indiscriminately deposited, a few at a time, upon the screw members 10—11 while the hopper is rotated. A funnel shaped housing 33 positioned below the hopper 20 and enclosing the lower portion thereof serves to guide the articles into the V shaped groove formed by the inner adjacent faces of the screw members 10—11. From the foregoing it will be readily apparent that rotation imparted to the screw member 10 will result in rotation of hopper 20 through the medium of sprocket 27, chain 26 and sprocket wheel 25.

Relay terminal members denoted generally by the numeral 36 (Figs. 7 and 8) are the parts to be arranged and magazined by the apparatus illustrated in the drawings. These terminals comprise a pendant or tail 37, head portion 38 having apertures 39—40 in vertical alignment, and an offset angular tang or projecting tip portion 41 integral therewith.

The terminals 36 are placed within the hopper 20 and rotation thereof results in the parts 36 being indiscriminately deposited upon the rotating screw members 10 and 11 having spiral ways 45 and 44, respectively, which serve to engage and advance the parts therealong. Some of the parts thus deposited fall into proper upright position with the tangs or tips 41 thereof projecting away from the screw member 10 and lodged within spiral way 44 of the screw member 11 with the lateral surfaces of the pendant portion 37 interposed between the adjacent surfaces of the screw members 10—11. Other parts, however, become improperly lodged in an upright position between the screw members 10—11 with their tang 41 inserted in a spiral way 45 in the screw member 10; in this event, the terminal part is advanced forward to a position designated by the numeral 46 (Fig. 1) where it is turned to thereby properly position the part with its tang 41 in the spiral groove or way 44 of the screw member 11.

It is believed that a thorough understanding of the aforementioned turning movement of the improperly positioned terminal parts may be had from the detailed progressive steps of the advancement of a part illustrated in Figs. 3 to 5 inclusive. When an improperly positioned part 36 indicated by the numeral 47 having its tang 41 lodged in the spiral way 45 is advanced to the position 46, the tang is transferred into a spiral groove 48 of smaller pitch than ways 44 and 45. At this point a spiral projection or cam 49 (Fig. 3) on the screw member 11 engages the edge of the head portion 38 opposite the tang 41 and directs that edge into the spiral way 44. Due to the smaller pitch of the spiral groove or way 48 the tang 41 is advanced less rapidly than the opposite edge of the head 38 so that a turning movement of the part is effected as shown in Fig. 4. It is to be noted that the groove 48 has a rounded edge which gives sufficient clearance to prevent binding or injury to the tang 41 in the turning of the part. In Fig. 5 the screw members 10—11 have been rotated through about 270° from the position shown in Fig. 1 which movement of the screw members has resulted in the part indicated as 47 being turned through approximately 150° and it will be readily seen that upon further rotation of the screw members the part will be turned around so as to face in a direction directly opposite from that which it originally held. As disclosed in Fig. 3 and as indicated by numeral 54 the part is turned around and is ready to be engaged by an advancing groove 55 having an increased pitch and adapted to advance the part into the way 44. Fig. 4 shows the part being advanced and in Fig. 5 the part has been fully advanced to prevent any possible interference with the part immediately behind it. A properly positioned part with its tang lodged in the spiral way 44 is not effected by the cam 49 since the part is advanced in front of it and is not engaged thereby.

In case an improperly positioned part passes through the groove 48 without being turned, another spiral way 51 provided in the screw member 10 will permit the part to drop through the screw members by reason of the fact that the depth of the way 51 is greater than the length of the tang 41. To further remove improperly positioned parts, especially those lying lengthwise between the screws, pins 52 secured to the screw member 11 are provided at desirable locations thereon. These pins serve to positively eject or in some instances cause the proper orientation of improperly positioned parts. A chute 56 secured to the sides of the end frames 12—13 is adapted to guide the parts ejected from the screw members 10—11 into a pan or any other suitable container (not shown).

After a properly positioned part is advanced by the spiral way 44 past the deep spiral 51 a spiral projection or cam 57 engages the part and turns it clockwise through 90° into a position for stacking as indicated by the numeral 58, (Figs. 1 and 2). The spiral cam 57 has a smaller pitch than the spiral way 44 thereby causing the edge of the terminal part upon which the tank is located to be advanced more rapidly than the opposite edge to thus effect a turning movement of the part. A portion 59 of the screw member 10 adjacent the cam 57 is rounded out to provide clearance and thus prevent injury to the part while it is being turned.

With a part 36 indicated as 58 turned through 90° the side edges thereof engage oppositely disposed spiral ways 60—61 in the screw members 10—11, respectively. These oppositely disposed spiral ways advance the part so that apertures 39 and 40 therein engage rods 64—65 of a magazine designated generally as 66. The magazine is designed to receive the terminal parts from the ways 60—61 and stack them with each tang 41 overlapping the tang portion of an adjacent part as shown in Figs. 1 and 6.

The magazine holder includes a pair of arms 67—67 suitably fastened to the end frame 12 and having a plate 68 (Fig. 6) secured therebetween. This plate serves to support and guide a movable end block 69 of the magazine having a projecting portion 70 in which are rigidly supported the stacking rods 64—65. Pivoted on the arms 67 is a latch 63 held in an upright position against the block 69 by a leaf spring 75 secured to the plate 68. Upon the rods 64—65 becoming filled with parts, other advancing parts push the block 69 backward which in turn forces the latch 63 downward as indicated by the dotted lines in Fig. 6, where it is held in a retracted position due to the leaf spring engaging a cam shaped portion 77 thereof. This backward movement of the block 69 carries the receiving ends 64—65 back of reduced portions 78—79 of the screw members 10—11 so that after the stacking rods are full all parts advanced from thence on will drop between the reduced ends of the screw members into the chute 56 where they will be guided into a suitable receptacle (not shown). From the foregoing description it will be readily seen that this construction prevents any possibility of jamming because of an overloaded magazine.

It will be understood that the embodiment of the invention herein described and illustrated is merely a convenient and useful form of the invention which is capable of many other modifications without departing from the spirit and scope of the invention as defined by the appended claims.

What is claimed is:

1. In an apparatus for arranging articles, a screw mechanism having a portion for receiving and advancing articles indiscriminately associated therewith, and another portion for reversing improperly positioned articles.

2. In an apparatus for arranging articles, a plurality of rotatable members for advancing articles indiscriminately associated therewith and having portions cooperating to turn improperly positioned articles to face in a direction opposite from that in which they originally faced, and means for rotating the members.

3. In an apparatus for arranging articles, a pair of rotatable cylindrical members for advancing articles indiscriminately associated therewith, and a cam carried by one of the members for turning improperly positioned articles through 180°.

4. In an apparatus for arranging articles, a pair of rotatable members each having portions with spiral ways for receiving and advancing articles, and other portions provided with spiral ways of different contour for turning certain improperly positioned articles to face in a direction opposite to that in which they originally faced.

5. In an apparatus for arranging articles, a rotatable member having a spiral way for advancing articles, and a spiral way of different pitch for turning only certain of the advancing articles into a reverse position.

6. In an apparatus for arranging articles, a screw mechanism having a portion for receiving and advancing articles indiscriminately associated therewith and a cam portion for turning over certain improperly positioned articles, and means for actuating the screw mechanism.

7. In an apparatus for arranging articles, a rotatable cylinder having a spiral groove for receiving and advancing articles, another cylinder associated therewith having a projecting cam portion for effecting the turning over of only certain of the articles, and means for rotating the cylinders.

8. In an apparatus for arranging articles, a screw mechanism for advancing an article associated therewith, and having a projecting cam portion for turning an improperly associated article through an angle greater than 90°.

9. In an apparatus for arranging articles, a screw mechanism having a portion for receiving and advancing articles, another portion for turning certain positioned articles through 180°, and means for ejecting improperly positioned articles.

10. In an apparatus for arranging articles, a magazine, means for advancing parts in a predetermined position thereto, and automatic means for disconnecting the magazine from the advancing means.

11. In an apparatus for arranging articles, a magazine, a screw mechanism removably connected thereto for receiving and advancing articles thereto and for arranging articles during their advancement, and means for disconnecting the magazine from the screw mechanism upon a predetermined condition.

12. In an apparatus for arranging articles, a magazine, a screw mechanism connected thereto for advancing properly positioned articles and for turning certain improperly positioned articles around to effect a proper position, means for ejecting improperly positioned articles at predetermined locations, and means for disconnecting the magazine from the screw mechanism upon the magazine becoming completely filled.

13. In an apparatus for arranging articles, a screw mechanism for advancing parts in a predetermined position, a magazine for receiving the parts, means for supporting the magazine, and a member associated therewith for operatively positioning the magazine and responsive to a predetermined condition for permitting the magazine to move into an inoperative position.

14. In an apparatus for arranging articles, a pair of oppositely rotating screw members for advancing parts in a predetermined position and having reduced portions at their delivery ends, a magazine for receiving the parts, a support therefor, a lever pivoted to the support for operatively positioning the magazine, and a spring for maintaining the lever in engagement with the magazine and responsive to an overload to permit disengagement of the member and the magazine whereby the advancing parts pass through the reduced portions of the screw members.

In witness whereof, I hereunto subscribe my name this 7 day of June, A. D. 1928.

MARVIN ROY OLSEN.